(12) United States Patent
Kim et al.

(10) Patent No.: US 12,145,629 B2
(45) Date of Patent: *Nov. 19, 2024

(54) APPARATUS FOR CONTROLLING AUTONOMOUS DRIVING OF A VEHICLE, SYSTEM HAVING THE SAME AND METHOD THEREOF

(71) Applicants: HYUNDAI MOTOR COMPANY, Seoul (KR); KIA CORPORATION, Seoul (KR)

(72) Inventors: Hee Kyung Kim, Seoul (KR); Jin Su Jeong, Suwon-si (KR); Jae Yong Jeon, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,501

(22) Filed: May 10, 2023

(65) Prior Publication Data
US 2023/0278594 A1 Sep. 7, 2023

Related U.S. Application Data

(63) Continuation of application No. 17/036,977, filed on Sep. 29, 2020, now Pat. No. 11,685,409.

(30) Foreign Application Priority Data

Mar. 26, 2020 (KR) ........................ 10-2020-0037053

(51) Int. Cl.
*B60W 60/00* (2020.01)
*B60Q 1/46* (2006.01)
(Continued)

(52) U.S. Cl.
CPC ........... *B60W 60/0051* (2020.02); *B60Q 1/46* (2013.01); *B60Q 1/52* (2013.01); *B60W 50/14* (2013.01);
(Continued)

(58) Field of Classification Search
CPC ............ B60W 60/0051; B60W 50/14; B60W 60/0018; B60W 60/00186;
(Continued)

(56) References Cited

U.S. PATENT DOCUMENTS

| 5,625,257 A | 4/1997 | Nunn |
| 10,202,121 B2 | 2/2019 | Nakatsuka et al. |

(Continued)

FOREIGN PATENT DOCUMENTS

| CN | 109795505 A | 5/2019 |
| EP | 3232286 A1 | 10/2017 |
| EP | 3552911 A2 | 10/2019 |

OTHER PUBLICATIONS

Office Action cited in Korean patent application No. 10-2020-0037053; Oct. 10, 2024; 10 pp.

*Primary Examiner* — Hunter B Lonsberry
*Assistant Examiner* — Harrison Heflin
(74) *Attorney, Agent, or Firm* — Lempia Summerfield Katz LLC

(57) ABSTRACT

An autonomous driving control apparatus for a vehicle includes: a processor that demands a user of a vehicle to take a control authority of the vehicle during an autonomous driving control when a current driving condition is in a limit situation during the autonomous driving control, and starts a minimum risk maneuver to disable reactivation of the autonomous driving control when the control authority is not transferred to the user; and a storage to store a set of instructions to be executed by the processor and data for (Continued)

determination and performance by the processor. In particular, the processor automatically flashes an emergency light when the minimum risk maneuver is started, and controls automatic flashing of the emergency light to not be released by the user when the vehicle is not in a stopped state.

5 Claims, 6 Drawing Sheets

(51) Int. Cl.
*B60Q 1/52* (2006.01)
*B60W 50/14* (2020.01)
*G05D 1/00* (2024.01)

(52) U.S. Cl.
CPC .. *B60W 60/0018* (2020.02); *B60W 60/00186* (2020.02); *B60W 60/0061* (2020.02); *G05D 1/0061* (2013.01); *B60W 2552/00* (2020.02)

(58) Field of Classification Search
CPC . B60W 60/0061; B60W 2552/00; B60Q 1/46; B60Q 1/52; G05D 1/0061
See application file for complete search history.

(56) References Cited

U.S. PATENT DOCUMENTS

| | | |
|---|---|---|
| 10,384,540 B2 | 8/2019 | Otake |
| 11,173,927 B2 | 11/2021 | Yu |
| 11,209,819 B2 | 12/2021 | Kuwahara |
| 2006/0146553 A1 | 7/2006 | Zeng et al. |
| 2014/0106699 A1 | 4/2014 | Chitre et al. |
| 2015/0094899 A1 | 4/2015 | Hackenberg et al. |
| 2017/0120887 A1 | 5/2017 | Kurahashi et al. |
| 2018/0037215 A1 | 2/2018 | Otake |
| 2018/0111628 A1 | 4/2018 | Tamagaki et al. |
| 2020/0180659 A1 | 6/2020 | Yu et al. |
| 2021/0101587 A1 | 4/2021 | Ide et al. |

APPARATUS FOR CONTROLLING AUTONOMOUS DRIVING OF A VEHICLE, SYSTEM HAVING THE SAME AND METHOD THEREOF

CROSS-REFERENCE TO RELATED APPLICATION

This application is a continuation application of non-provisional U.S. patent application Ser. No. 17/036,977, filed on Sep. 29, 2020, which claims priority to and the benefit of Korean Patent Application No. 10-2020-0037053, filed on Mar. 26, 2020, the entire contents of each of which are incorporated herein by reference.

FIELD

The present disclosure relates to an autonomous driving control apparatus for a vehicle, a system including the same, and a method thereof.

BACKGROUND

The statements in this section merely provide background information related to the present disclosure and may not constitute prior art.

With the development of the automobile industry, the development of an autonomous driving system and a driving assistance system (Hereinafter, for convenience of description, both autonomous driving and driving assistance are referred to as autonomous driving) that partially enables autonomous driving has been developed.

The autonomous driving system may provide various functions such as maintaining a predetermined speed, maintaining a distance between vehicles, maintaining a lane, and changing a lane. The autonomous driving system may perform autonomous driving by using various devices such as sensors for sensing vehicle's external environment, sensors for sensing vehicle information, GPS, precision maps, user state sensing systems, steering actuators, acceleration and deceleration actuators, communication circuits, and control circuits (e.g., electronic control units (ECUs)).

The autonomous driving system may monitor user's condition, and may provide an appropriate minimum risk maneuver (MRM) according to the user's condition.

The above information disclosed in this Background section is only for enhancement of understanding of the background of the present disclosure, and therefore it may contain information that does not form the prior art that is already known to a person of ordinary skill in the art.

SUMMARY

The present disclosure provides an autonomous driving control apparatus for a vehicle, a system including the same, and a method thereof, capable of automatically flashing an emergency light and inhibiting the emergency light from being released by a user while the vehicle is driven, to protect the host vehicle and alert surrounding vehicles, after starting a minimum risk maneuver of the autonomous vehicle.

The technical objects of the present disclosure are not limited to the objects mentioned above, and other technical objects not mentioned can be clearly understood by those skilled in the art from the description of the claims.

In an exemplary form of the present disclosure, an autonomous driving control apparatus includes: a processor configured to demand a user of a vehicle to take a control authority of a the vehicle when determining that a current driving condition is in a limit situation during an autonomous driving control, and to start a minimum risk maneuver to transmit a signal for disabling reactivation of an autonomous driving control function when control authority is not transferred to the user; and a storage configured to store a set of instructions to be executed by the processor and data for determination and performance by the processor. In particular, the processor automatically flashes an emergency light when the minimum risk maneuver is started, and controls automatic flashing of the emergency light to not be released by the user when the vehicle is not in a stopped state.

In an exemplary form, the processor may determines whether the current driving situation is in the limit situation in which an autonomous driving control function is not able to operate, based on road information or sensing information.

In an exemplary form, the processor may release the autonomous driving control function when the control authority is transferred to the user within a predetermined time or immediately after performing the minimum risk maneuver.

In an exemplary form, the processor may determine whether the vehicle is stopped when the control authority is not transferred to the user within a predetermined time after starting the minimum risk maneuver.

In an exemplary form, the processor may transmit an emergency light deactivation signal for turning off the emergency light when receiving a demand for turning off the emergency light from the user in a state where the vehicle is stopped.

In an exemplary form, when the processor receives a demand for turning off the emergency light from the user in a state where the vehicle is not stopped, the processor may ignore the turn-off demand and continuously transmits an emergency light activation signal to flash the emergency light.

In an exemplary form, the processor may transmit the signal for disabling reactivation of an autonomous driving control function to at least one of an input device for inputting an autonomous driving control function command, an output device for outputting an autonomous driving control state, or a device related to the autonomous driving control function in a vehicle.

An exemplary form of the present disclosure provides a vehicle system including: an emergency light flashing control device configured to control an emergency light to be turned on or off; and an autonomous driving control apparatus configured to demand a user of a vehicle to take over a control authority of the vehicle when a current driving condition is in a limit situation during an autonomous driving control, and to start a minimum risk maneuver when the control authority is not transferred to the user, to transmit a signal for disabling reactivation of the autonomous driving control, wherein the autonomous driving control apparatus automatically flashes an emergency light when the minimum risk maneuver is started, and controls automatic flashing of the emergency light to not be released by the user when the vehicle is not in a stopped state.

In an exemplary form, the vehicle system may further include: an input device configured to receive a control command to turn on or off the emergency light, an activation command for an autonomous driving control function, and the like from the user and an output device configured to output at least one of an activation or deactivation state of the autonomous driving control function, a demand guidance for control authority transition, or a guidance message for reporting that the autonomous driving control function cannot be reactivated.

In an exemplary form, the autonomous driving control apparatus may transmits the signal for disabling reactivation of the autonomous driving control function to at least one of the input device, the output device, or a device related to the autonomous driving control function in a vehicle.

In an exemplary form, the autonomous driving control apparatus may determines whether the current driving situation is in the limit situation in which an autonomous driving control function is not able to operate, based on road information or sensing information.

In an exemplary form, the autonomous driving control apparatus may release the autonomous driving control function when the control authority is transferred to the user within a predetermined time after starting the minimum risk maneuver.

In an exemplary form, the autonomous driving control apparatus may determine whether the vehicle is stopped when the control authority is not transferred to the user within a predetermined time after starting the minimum risk maneuver.

In an exemplary form, the autonomous driving control apparatus may transmit an emergency light deactivation signal for turning off the emergency light when receiving a demand for turning off the emergency light from the user in a state where the vehicle is stopped, and, when receiving a demand for turning off the emergency light from the user in a state where the vehicle is not stopped, may ignore the turn-off demand and continuously transmits an emergency light activation signal.

An exemplary form of the present disclosure provides an autonomous driving control method, including: determining whether a current driving condition is in a limit situation in which an autonomous driving control function is not able to operate during autonomous driving control; performing a demand for control authority transition of a user when determining that the current driving condition is in the limit situation; starting a minimum risk maneuver when control authority is not transferred to the user; transmitting a signal for disabling reactivation of an autonomous driving control function; flashing the emergency light automatically; and controlling automatic flashing of the emergency light to not be released by the user when the vehicle is not stopped.

In an exemplary form, the autonomous driving control method may further include releasing the autonomous driving control function when the control authority is transferred to the user within a predetermined time after starting the minimum risk maneuver.

In an exemplary form, the controlling of the automatic flashing of the emergency light to not be released may include transmitting an emergency light deactivation signal for turning off the emergency light when receiving a demand for turning off the emergency light from the user in a state where the vehicle is stopped.

In an exemplary form, the controlling of the automatic flashing of the emergency light to not be released may include, when receiving a demand for turning off the emergency light from the user in a state where the vehicle is not stopped, ignoring the turn-off demand and continuously transmitting an emergency light activation signal.

An exemplary form of the present disclosure provides an autonomous driving control apparatus including: a processor configured to perform a demand to transfer a control authority of a vehicle to a user of the vehicle when determining that a current driving condition is in a limit situation during autonomous driving control, to start a minimum risk maneuver when the control authority is not transferred to the user, and to control it to ignore a reactivation command of the autonomous driving control function inputted from the user while performing the minimum risk maneuver; and a storage configured to store a set of instruction implementing algorithms to be executed by the processor and data for determination and performance by the processor, wherein the processor automatically flashes an emergency light when the minimum risk maneuver is started, and controls automatic flashing of the emergency light to not be released by the user when the vehicle is not stopped.

In an exemplary form, the processor may perform the reactivation command of the autonomous driving control function when the vehicle is stopped after the minimum risk maneuver is started and the reactivation command of the autonomous driving control function is inputted from the user after the vehicle is restarted.

According to this technique, it is possible to protect a host vehicle and surrounding vehicles by controlling an emergency light to be automatically flashed and the emergency light to not be turned off by a user when the vehicle is not stopped, after starting the minimum risk maneuver.

In addition, various effects that can be directly or indirectly identified through this document may be provided.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
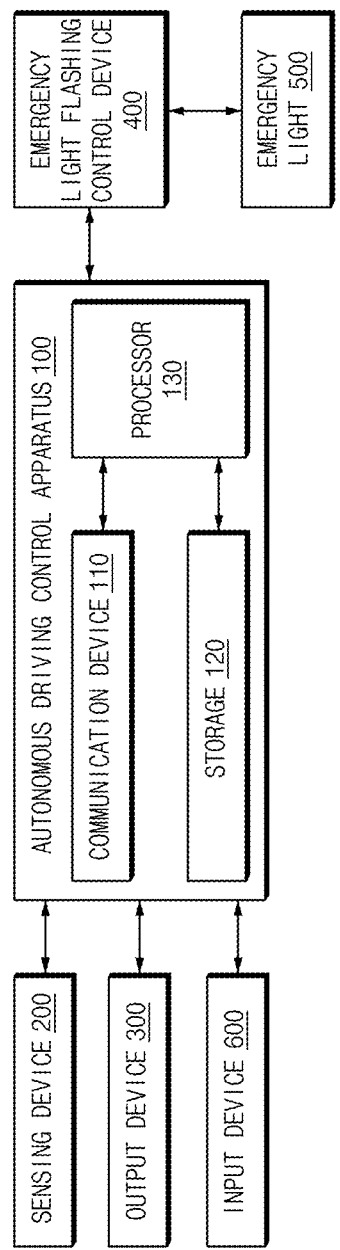
FIG. 1 illustrates a block diagram showing a configuration of a vehicle system including an autonomous driving control apparatus according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some exemplary forms of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary forms of the present disclosure, when it is determined that detailed descriptions of related well-known configurations or functions interfere with understanding of the exemplary forms of the present disclosure, the detailed descriptions thereof will be omitted.

In describing constituent elements according to an exemplary form of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary forms of the present disclosure will be described in detail with reference to FIG. 1 to FIG. 6.

FIG. 1 illustrates a block diagram showing a configuration of a vehicle system including an autonomous driving control apparatus according to an exemplary form of the present disclosure.

Referring to FIG. 1, the vehicle system includes: an autonomous driving control apparatus 100 for a vehicle, a sensing device 200, an output device 300, an emergency light flashing control device 400, an emergency light 500, and an input device 600.

The autonomous driving control apparatus 100 may be implemented inside the vehicle. In this case, the autonomous driving control apparatus 100 may be integrally formed with internal control units of the vehicle, or may be implemented as a separate device to be connected to control units of the vehicle by a separate connection means.

The autonomous driving control apparatus 100 for may perform at least one function among a smart cruise control (SCC), a forward collision warning (FCW), a lane keeping assist (LKA) & lane departure warning (LDW), a lane change alert (LCA), a highway driving assist (HDA), and a lane following assist (LFA).

The autonomous driving control apparatus 100 demands control authority transition of a user when a current driving condition is determined as a dangerous situation during autonomous driving control, and starts a minimum risk maneuver (MRM) to decelerate and stop the vehicle when the user does not permit the control authority transition.

In addition, the autonomous driving control apparatus 100 may automatically flash the emergency light to protect a host vehicle and to inform the dangerous situation of surrounding vehicles when starting the minimum risk maneuver. In addition, when the user arbitrarily tries to turn off the emergency light in a state in which the vehicle has not yet stopped due to the end of the minimum risk maneuver or the like, the autonomous driving control apparatus 100 may ignore this try and control flashing of the emergency light to be maintained until the minimum risk maneuver is ended and the vehicle is stopped, to prevent the dangerous situation.

To this end, the autonomous driving control apparatus 100 may include a communication device 110, a storage 120, and a processor 130.

The communication device 110, which is a hardware device implemented with various electronic circuits to transmit and receive signals through a wireless or wired connection, may perform communications with devices in the vehicle by using a network communication technique in the vehicle in the present disclosure, and the communications with the devices in the vehicle may be performed through controller area network (CAN) communication, local interconnect network (LIN) communication, and flex-ray communication.

As an example, the communication device 110 may transmit and receive control signals and data with respect to the sensing device 200 and the emergency light flashing control device 400.

The storage 120 may store sensing results of the sensing device 200 and data and/or algorithms required for the processor 130 to operate, and the like.

As an example, the storage 120 may store road information etc. required for autonomous driving. For example, the road information may include a map, and the like. For example, the road information may include information related to road types (e.g., an automobile road or a general road), road end points, and characteristics of lanes (e.g., confluence lanes, etc.)

The storage 120 may include a storage medium of at least one type among memories of types such as a flash memory, a hard disk, a micro, a card (e.g., an secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, may electrically control each component, and may be an electrical circuit that executes software commands, thereby performing various data processing and calculations described below.

The processor 130 may process signals transferred between constituent elements of the autonomous driving control apparatus 100 and the devices in the vehicle. The processor 130 may be, e.g., an electronic control unit (ECU), a micro controller unit (MCU), or other subcontrollers mounted in the vehicle.

The processor 130 may perform autonomous driving control. For example, the processor 130 may perform driving assistance control on the automobile road. In addition, the processor 130 may control activation of the autonomous driving control function or deactivation (release) of the autonomous driving control function.

The processor 130 may determine whether a current driving condition is in a limit situation in which the autonomous driving control function is not able to operate, based on at least some of sensing information or road information during the autonomous driving control. Herein, the limit situation may include a deviation from an operation design area of the autonomous driving control function, and the like. That is, the autonomous driving control apparatus 100 may determine whether the current driving condition is in the limit situation, such as a road environment, vehicle behavior, or user misoperation, in which maintaining functions of lanes and distances between vehicles cannot be properly operated.

When it is determined that the current driving condition is in the limit situation, the processor 130 may demand control authority transition in vertical and horizontal direction. When the control authority transition is not permitted by the user, the processor 130 may start the minimum risk maneuver. In this case, the minimum risk maneuver may include performing deceleration with a constant deceleration (e.g., 1 m/s$^2$) and stop control when the user does not permit the control authority transition despite the demand for the control authority transition for a predetermined time (e.g., 10 s).

When the minimum risk maneuver is started, the processor 130 sends an emergency activation signal to the emergency light flashing control device 400 to automatically flash the emergency light, and sends a signal for disabling reactivation of the autonomous driving control function. That is, when the autonomous driving control function is released after the minimum risk maneuver is started, the autonomous driving control function may be started after the vehicle is restarted.

The processor 130 may release the autonomous driving control function when the control authority is transferred to the user within a predetermined time after starting the minimum risk maneuver.

The processor 130 may determine whether the vehicle is stopped when the control authority is not transferred to the user within a predetermined time after starting the minimum risk maneuver. The processor 130 may determine whether the vehicle is stopped based on a wheel speed of the vehicle.

When receiving a demand for turning off the emergency light from the user, the processor 130 may turn off the emergency light by transmitting an emergency light deactivation signal in a state where the vehicle is stopped after the minimum risk maneuver. In this case, the processor 130 may receive the demand for turning off the emergency light through the input device 600.

When the vehicle is not yet stopped after the minimum risk maneuver, i.e., when receiving the demand for turning off the emergency light from the user while the vehicle is driven, the processor 130 ignores the turn-off demand of the user and continuously transmits the emergency light activation signal to maintain a turn-on state of the emergency light until the vehicle is stopped. Accordingly, the processor 130 may allow surrounding vehicles to recognize that the dangerous situation is not over so as to prepare for the dangerous situation by continuously flashing the emergency light until the danger situation is ended.

The sensing device 200 may detect vehicle surrounding information. For example, the sensing device 200 may detect information (e.g., position, speed, and acceleration) related to an external object (e.g., vehicles, pedestrians, etc.) positioned in a front, rear, or side of the vehicle.

The sensing device 200 may detect vehicle information, e.g., positions, speeds, accelerations, steering angles, and the like of target vehicles, and a wheel speed of a host vehicle. To this end, the sensing device 200 may include an ultrasonic sensor, a radar, a camera, a laser scanner, and/or a corner radar, a lidar, an acceleration sensor, a yaw rate sensor, a torque measurement sensor and/or a wheel speed sensor, a steering angle sensor, a wheel speed sensor, etc.

The output device 300 may output notifications of, e.g., an activation or deactivation state of the autonomous driving control function, a demand for control authority transition, a message reporting that the autonomous driving control function cannot be reactivated. In addition, the output device 300 may provide a notification that the user of the vehicle can sensibly perceive. For example, the output device 300 may include a display, a voice output means such as a speaker, and/or a vibration motor. In this case, the display may include at least one of a liquid crystal display (LCD), a thin film transistor liquid crystal display (TFT LCD), an organic light emitting diode display (OLED display), a flexible display, a field emission display (FED), or a 3D display. In this case, when a touch sensor formed of a touch film, a touch sheet, or a touch pad is provided on the display, the display may operate as a touch screen, and may be implemented in a form in which an input means and an output means are integrated.

The emergency light flashing control device 400 receives the emergency light activation signal or the emergency light deactivation signal from the autonomous driving control apparatus 100 to control an on or off state of the emergency light 500.

The emergency light 500 is controlled to be flashed by the emergency light flashing control apparatus 400.

The input device 600 serves to receive on and off control commands of the emergency light 500, an activation command for an autonomous driving control function, and the like from the user. In this case, in the present disclosure, although one input device 600 is implemented as an example, buttons for turning on and off the emergency light and a button for activating the autonomous driving control function may be separately provided. The input device 600 may receive a command for, e.g., activation of the autonomous driving control function, from a user, and may not transfer the activation command of the autonomous driving control function to the autonomous driving control apparatus 100 when receiving the signal for disabling reactivation of the autonomous driving control function transmitted from the autonomous driving control apparatus 100. Accordingly, when receiving the signal for disabling reactivation of the autonomous driving control function, although an autonomous driving control command is inputted from the user, the input device 600 prevents the autonomous driving control function from being activated unless the vehicle is restarted. That is, the input device 600 may transmit the autonomous driving control command inputted from the user to the autonomous driving control apparatus 100 after the vehicle is restarted, after receiving the signal for disabling reactivation of the autonomous driving control function.

The input device 600 may include a key button, and may include a mouse, a joystick, a jog shuttle, a stylus pen, and the like. In addition, the input device 600 may include soft keys implemented on the display.

The present disclosure having such a configuration may allow the emergency light to be automatically turned on when the minimum risk maneuver is started during the autonomous driving control, and even when a manipulation for turning off the emergency light is made by the user unless the vehicle stops, it may ignore the turn-off manipulation, and may continue to alert the surrounding vehicles to prevent the dangerous situation as much as possible.

Figure 2:
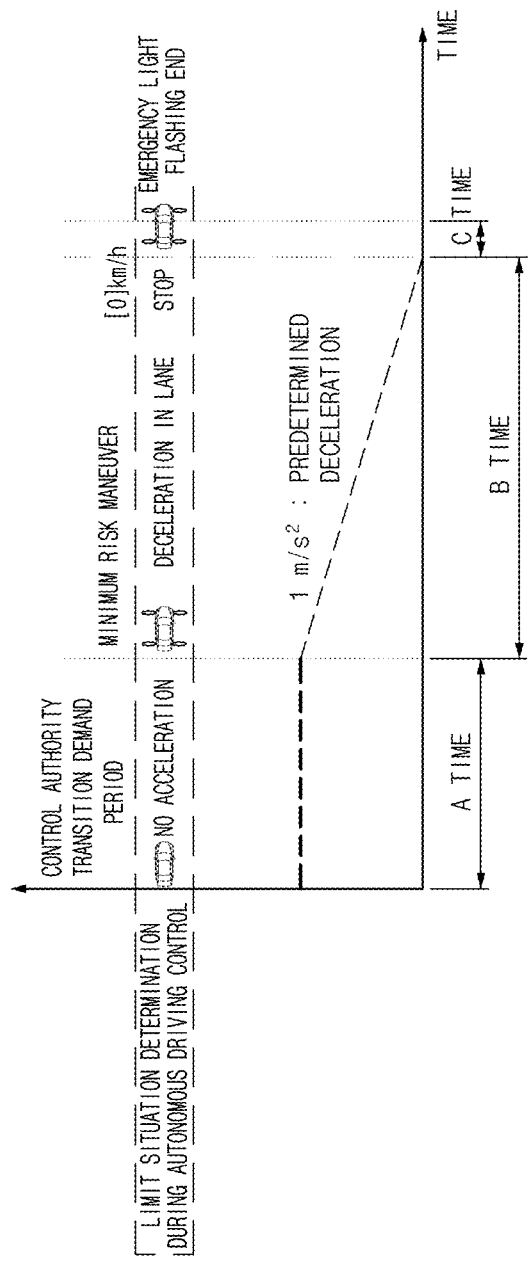
FIG. 2 illustrates an exemplary operation of an autonomous driving control apparatus for a vehicle according to an exemplary form of the present disclosure.

FIG. 2 illustrates an exemplary operation of an autonomous driving control apparatus according to an exemplary form of the present disclosure, showing an operation mechanism for control authority transition notification and minimum risk maneuver driving.

First, the autonomous driving control apparatus 100 determines whether the current driving condition is in the limit situation, such as a road environment, vehicle behavior, or user misoperation, in which maintaining functions of lanes and distances between vehicles cannot be properly operated, and notifies the user of the demand for control authority transition when it is determined that the current driving condition is in the limit situation. In this case, the autonomous driving control apparatus 100 may define a control authority transition demand period as A time (e.g., 10 s), and may make a setting so as not to accelerate the vehicle during the corresponding period. When the user does not permit the control authority transition within the predetermined time (A time) after a predetermined time after the limit situation occurs, the autonomous driving control apparatus 100 enters a minimum risk maneuver step. The autonomous driving control apparatus 100 transfers an emergency light activation signal to the emergency light flashing control device 400 within a predetermined time (e.g., 1 s) after the minimum risk maneuver is started, to automatically flash the emergency light.

The autonomous driving control apparatus 100 continuously demands the control authority transition of the user even while the minimum risk maneuver is performed. The autonomous driving control apparatus 100 performs deceleration control with a predetermined deceleration (e.g., 1 m/s$^2$) during a minimum risk maneuver driving period, and performs stop control within a predetermined B time (e.g., up to 30 s at the maximum).

The autonomous driving control 100 transfers an emergency light deactivation signal to the emergency light flashing control device 400 within a predetermined C time (e.g., 1 s) after the minimum risk maneuver is ended, to automatically end the flashing of the emergency light.

Figure 3:
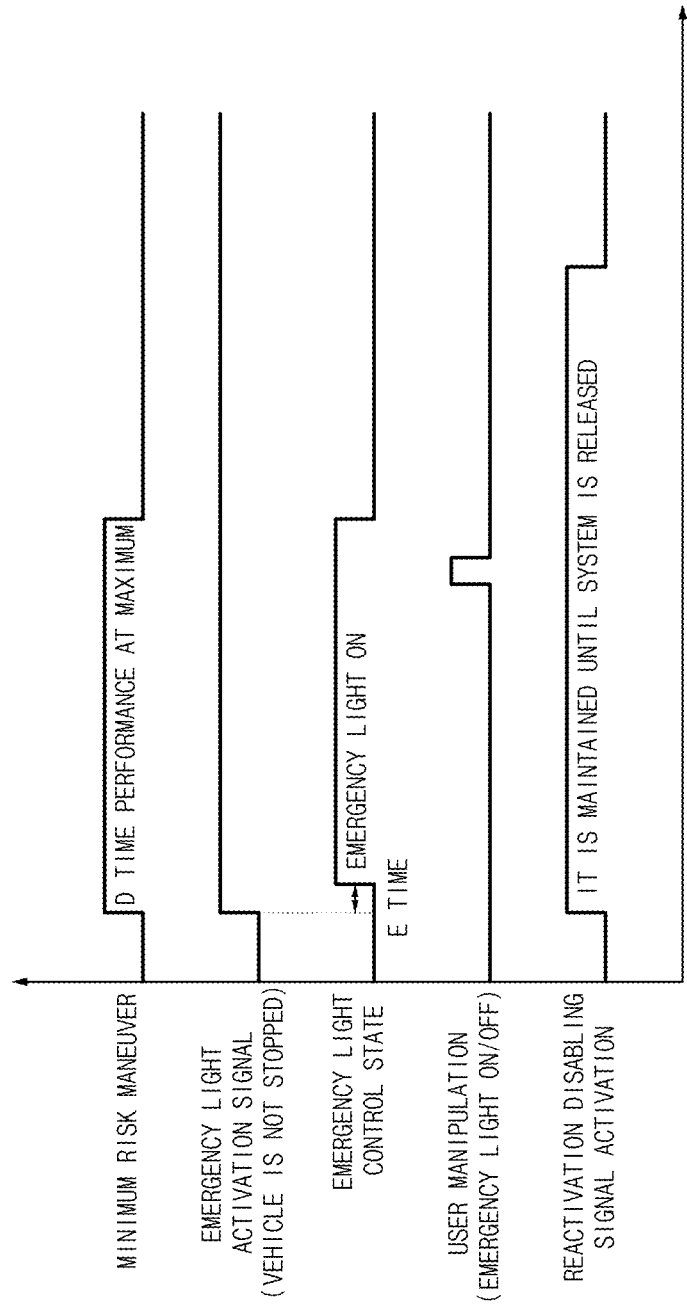
FIG. 3 illustrates an exemplary operation of an autonomous driving control apparatus for a vehicle according to an exemplary form of the present disclosure.

FIG. 3 illustrates an exemplary operation of an autonomous driving control apparatus according to an exemplary form of the present disclosure, showing an emergency light operation mechanism when the vehicle is not stopped while the minimum risk maneuver is performed.

First, the autonomous driving control apparatus 100 performs the minimum risk maneuver for a predetermined D time (e.g., up to 30 s at the maximum), and decelerates the vehicle with a constant deceleration (e.g., 1 m/s$^2$) before the vehicle stops.

In this case, when the minimum risk maneuver is started, the emergency light activation signal and the signal for disabling reactivation of the autonomous driving control function are automatically transmitted.

When a command for turning off the emergency light is inputted by the user while the minimum risk maneuver is performed, the autonomous driving control apparatus 100 determines whether the vehicle is stopped based on a wheel speed of the vehicle, and ignores the turn-off command and continuously transmits the emergency light deactivation signal to maintain the turn-on state of the emergency light in the case where the vehicle is not stopped.

In this case, it can be seen that a control state of the emergency light is an on state within a predetermined E time (e.g., 10 ms) after the emergency light activation signal is transmitted.

Figure 4:
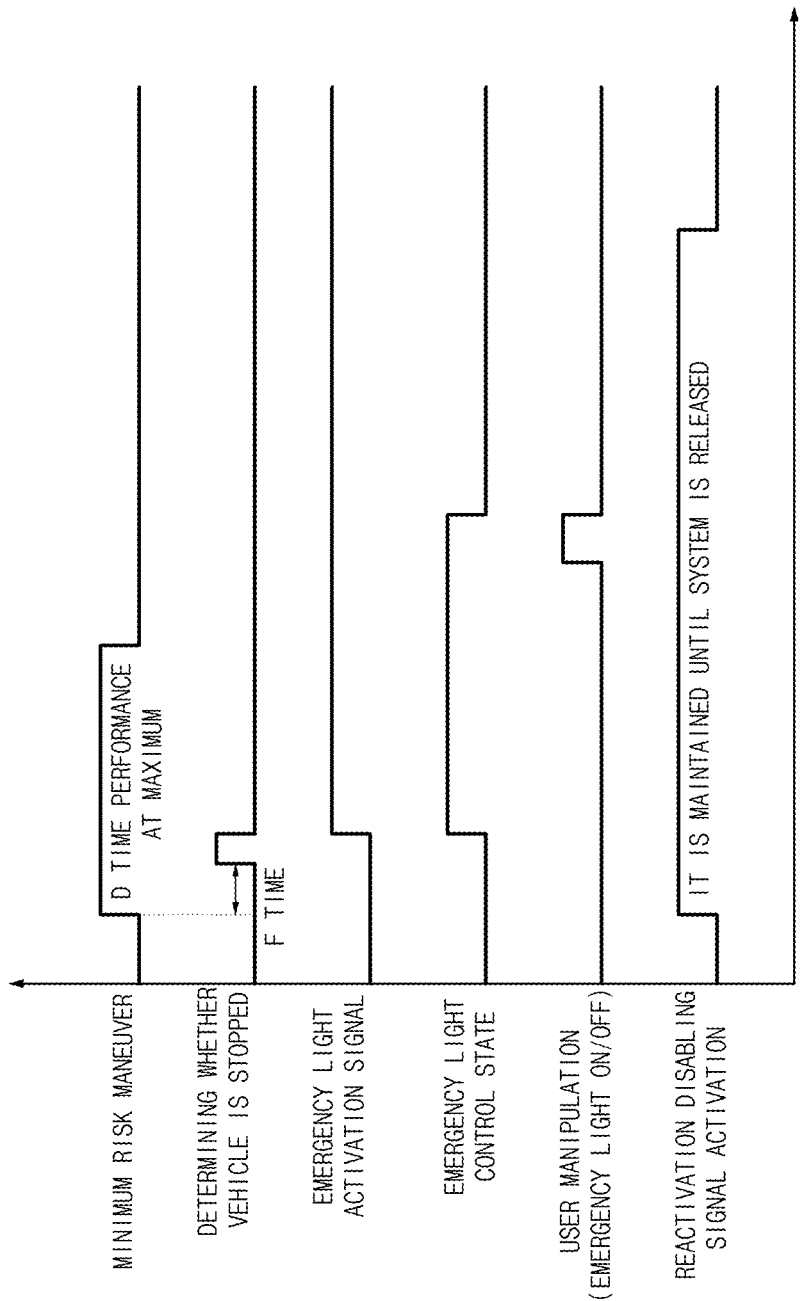
FIG. 4 illustrates an exemplary operation of an autonomous driving control apparatus for a vehicle according to an exemplary form of the present disclosure.

FIG. 4 illustrates an exemplary operation of an autonomous driving control apparatus according to an exemplary form of the present disclosure, showing an emergency light operation mechanism when the vehicle stops while the minimum risk maneuver is performed.

Referring to FIG. 4, the autonomous driving control apparatus 100 performs the minimum risk maneuver for a predetermined D time (e.g., up to 30 s at the maximum), and decelerates the vehicle with a constant deceleration (e.g., 1 m/s$^2$) before the vehicle stops.

In this case, when the minimum risk maneuver is started, the signal for disabling reactivation of the autonomous driving control function is automatically transmitted.

The autonomous driving control apparatus 100 determines whether the vehicle is stopped based on the wheel speed of the vehicle while the minimum risk maneuver is performed, and transmits the emergency light activation signal to the emergency light flashing control device 400 after a predetermined F time (e.g., 2 s or 4 s).

When the vehicle stops within the predetermined F time after the minimum risk maneuver is started, even though the F time has not elapsed, the autonomous driving control apparatus 100 may transmit the emergency light activation signal. In this case, it can be seen that a control state of the emergency light is an on state after the emergency light activation signal is transmitted.

When the command for turning off the emergency light is inputted from the user while the emergency light is turned on by the emergency light activation signal, the autonomous driving control apparatus 100 transmits the emergency light deactivation signal for turning off the emergency light, to turn off the emergency light because the vehicle is stopped.

When the vehicle is stopped, the emergency light may be deactivated only by user manipulation, and the autonomous driving control function may also be released by the user manipulation.

Figure 5:
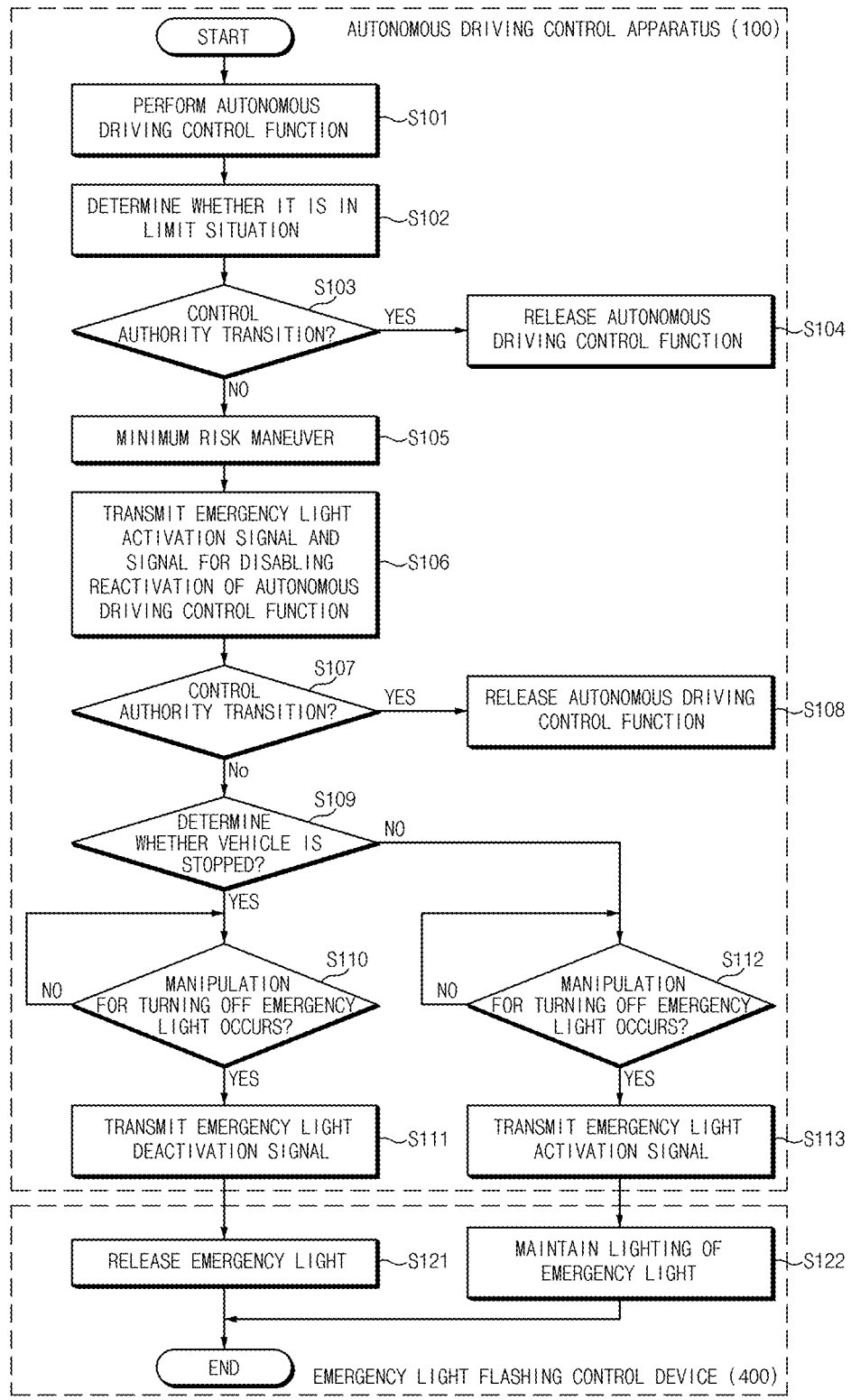
FIG. 5 illustrates an autonomous driving control method for a vehicle according to an exemplary form of the present disclosure.

Hereinafter, an autonomous driving control method when the minimum risk maneuver for a vehicle is started according to an exemplary form of the present disclosure will be described in detail with reference to FIG. 5. FIG. 5 illustrates an autonomous driving control method for a vehicle according to an exemplary form of the present disclosure.

Hereinafter, it is assumed that the autonomous driving control apparatus 100 of the vehicle of FIG. 1 performs processes of FIG. 5. In addition, in the description of FIG. 5, operations described as being performed by a device may be understood as being controlled by the processor 130 of the autonomous driving control apparatus 100 of the vehicle.

Referring to FIG. 5, the autonomous driving control apparatus 100 may determine whether the limit situation has occurred (S102) while performing an autonomous driving control mode (S101). In this case, the limit situation is a situation in which the autonomous driving control function cannot normally operate, and may include, e.g., a situation in which the autonomous driving control function is out of an operating design area.

The autonomous driving control apparatus 100 demands control authority transition in vertical and horizontal direction such that the user can directly control the driving in the limit situation (S103). Accordingly, when the user permits the control authority transition, the autonomous driving control apparatus 100 releases the autonomous driving control mode (S104).

On the other hand, when the user does not permit the control authority transition within a predetermined time (e.g., 10 s) despite the limited situation, the autonomous driving control apparatus 100 starts the minimum risk maneuver (S105). In this case, the minimum risk maneuver may include performing deceleration with a predetermined speed and stop control.

The autonomous driving control apparatus 100 may transmit an emergency light activation signal and a signal for disabling reactivation of the autonomous driving control function (S106). In this case, the emergency light activation signal is transmitted to the emergency light flashing control device 400, and the emergency light is automatically turned on by the emergency light activation signal. The signal for disabling reactivation of the autonomous driving control function may be transmitted to a device related to the autonomous driving in the vehicle or the output device 300.

The autonomous driving control apparatus 100 continues to determine whether the control authority transition is permitted after the minimum risk maneuver (S107), and releases the autonomous driving control function when the control authority transition is permitted by the user (S108). In this case, even when the vehicle is not stopped during the minimum risk maneuver, control authority may be transferred to the user at any time, and when the autonomous driving control function is released by transferring the control authority, a manipulation for turning off the emergence light may be made at any time.

On the other hand, when the control authority is not transferred to the user even after the minimum risk maneuver is started, the autonomous driving control apparatus 100 continues to perform the minimum risk maneuver, and may transmit the emergency light activation signal and the signal for disabling reactivation of the autonomous driving control function (S108). In this case, the signal for disabling reactivation of the autonomous driving control function may be transmitted to the input device 600, the output device 300, the device related to the autonomous driving in the vehicle, and the like. Accordingly, the output device 300 may output a guide message to the user to report that reactivation is not possible before restarting.

Subsequently, the autonomous driving control apparatus 100 determines whether the vehicle is stopped based on a wheel speed of the vehicle when the minimum risk maneuver is ended (S109).

After the vehicle is determined to be stopped, when the manipulation for turning off the emergence light is inputted from the user (S110), the autonomous driving control apparatus 100 transmits the emergency light deactivation signal to the emergency light flashing control device 400 (S111), and the emergency light flashing control device 400 releases lighting of the emergency light (S121). However, the autonomous driving control apparatus 100 may be implemented to transmit the emergency light deactivation signal to release the lighting of the emergency light even when an input for turning off the emergency light is not received while the vehicle is stopped.

On the other hand, when the vehicle is not stopped, even though the manipulation for turning off the emergence light is inputted from the user (S112), the autonomous driving control apparatus 100 continuously transmits the emergency light activation signal to the emergency light flashing control device 400 (S113), and the emergency light flashing control device 400 maintains the lighting of the emergency light (S122).

As described above, in the present disclosure, after determining a limit situation in which autonomous driving control is impossible during autonomous driving control, when the minimum risk maneuver is started because a driver does not receive the control authority, it is possible to send a warning alarm to surrounding vehicles by compulsorily turning on the emergency light.

In addition, the present disclosure may continuously warn the surrounding vehicles that they are in a dangerous situation until the vehicle is completely stopped in the dangerous situation by preventing flashing of the emergency light from being stopped by the manipulation for turning off the emergence light that is made by the user until the vehicle is stopped due to the end of the minimum risk maneuver or the vehicle is stopped during the minimum risk maneuver.

Figure 6:
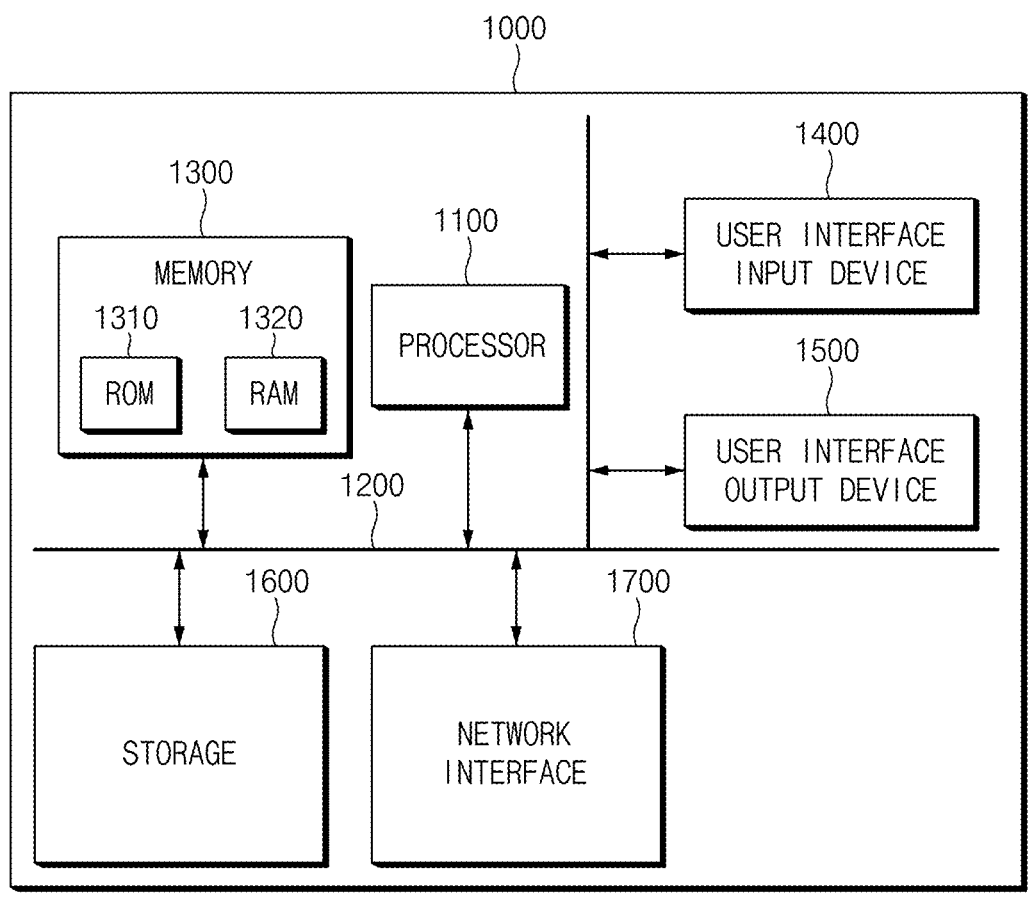
FIG. 6 illustrates a computing system according to an exemplary form of the present disclosure.

FIG. 6 illustrates a computing system according to an exemplary form of the present disclosure.

Referring to FIG. 6, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) and a random access memory (RAM).

Accordingly, steps of a method or algorithm described in connection with the exemplary forms disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, a EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the desired characteristics of the present disclosure.

Therefore, the exemplary forms disclosed in the present disclosure are not intended to limit the technical ideas of the present disclosure, but to explain them, and the scope of the technical ideas of the present disclosure is not limited by these exemplary forms. The protection range of the present disclosure should be interpreted by the claims below, and all technical ideas within the equivalent range should be interpreted as being included in the scope of the present disclosure.

What is claimed is:

1. An autonomous driving control apparatus comprising:
a processor configured to:
determine, based on road information or sensing information, whether a current driving condition is in a limit situation in which an autonomous driving control function is not able to operate,
demand a user of a vehicle to take a control authority of the vehicle when determining that the current driving condition of the vehicle is in the limit situation in which the autonomous driving control function is not able to operate, during an autonomous driving control, and
start a minimum risk maneuver when the control authority is not transferred to the user;
an output device for outputting an autonomous driving control state, or a device related to the autonomous driving control in the vehicle; and
a storage configured to store a set of instructions to be executed by the processor and data for determination and performance by the processor, wherein the processor is further configured to:
  transmit an emergency light activation signal to automatically flash an emergency light when the minimum risk maneuver is started,
  release the autonomous driving control when the control authority is transferred to the user within a predetermined time after starting the minimum risk maneuver,
  determine whether the vehicle is stopped when the control authority is not transferred to the user within the predetermined time after starting the minimum risk maneuver,
  when a turn-off demand of the user is received by the processor while the vehicle is not stopped after the minimum risk maneuver is started, ignore the turn-off demand of the user and continually transmit the emergency light activation signal to maintain a turn-on state of the emergency light until the vehicle is stopped, and
  when the vehicle is stopped after the minimum risk maneuver is started, transmit an emergency light deactivation signal to turn off the emergency light in response to determining that the vehicle is stopped when a turn-off demand is received from the user.

2. A vehicle system comprising:
an emergency light flashing control device configured to control an emergency light to be turned on or off;
an autonomous driving control apparatus configured to:
  determine, based on road information or sensing information, whether a current driving condition is in a limit situation in which an autonomous driving control function is not able to operate,
  demand a user of a vehicle to take a control authority of the vehicle when the current driving condition is in the limit situation in which the autonomous driving control function is not able to operate, during an autonomous driving control,
  start a minimum risk maneuver when the control authority is not transferred to the user,
  transmit an emergency light activation signal to automatically flash an emergency light when the minimum risk maneuver is started,
  release the autonomous driving control when the control authority is transferred to the user within a predetermined time after starting the minimum risk maneuver,
  determine whether the vehicle is stopped when the control authority is not transferred to the user within the predetermined time after starting the minimum risk maneuver,
  when a turn-off demand of the user is received by the autonomous driving control apparatus while the vehicle is not stopped after the minimum risk maneuver is started, ignore the turn-off demand of the user and continually transmit the emergency light activation signal to maintain a turn-on state of the emergency light until the vehicle is stopped, and
  when the vehicle is stopped after the minimum risk maneuver is started, transmit an emergency light deactivation signal to turn off the emergency light in response to determining that the vehicle is stopped when a turn-off demand is received from the user;
an input device configured to receive from the user a control command to turn on or off the emergency light, an activation command for an autonomous driving control; and
an output device configured to output at least one of an activation or deactivation state of the autonomous driving control, a demand guidance to transfer the control authority, or a guidance message for reporting that the autonomous driving control cannot be reactivated.

3. An autonomous driving control method comprising:
determining, by a processor based on road information or sensing information, whether a current driving condition is in a limit situation in which an autonomous driving control function is not able to operate, during an autonomous driving control;
requesting, by the processor, a transfer of a control authority of a vehicle to a user of the vehicle when determining that the current driving condition is in the limit situation;
starting, by the processor, a minimum risk maneuver when the control authority is not transferred to the user;
transmitting, by the processor, an emergency light activation signal to automatically flash an emergency light, the emergency light activation signal being transmitted to at least one of an input device for inputting an autonomous driving control command, an output device for outputting an autonomous driving control state, or a device related to the autonomous driving control in the vehicle;
releasing the autonomous driving control when the control authority is transferred to the user within a predetermined time after starting the minimum risk maneuver;
determining whether the vehicle is stopped when the control authority is not transferred to the user within the predetermined time after starting the minimum risk maneuver; and
when a turn-off demand of the user is received by the processor while the vehicle is not stopped after the minimum risk maneuver is started, ignoring, by the processor, a turn-off demand of the user and continually transmitting the emergency light activation signal to maintain a turn-on state of the emergency light until the vehicle is stopped; and
when the vehicle is stopped after the minimum risk maneuver is started, transmitting, by the processor, an emergency light deactivation signal to turn off the emergency light in response to determining that the vehicle is stopped when a turn-off demand is received from the user.

4. An autonomous driving control apparatus comprising:
a processor configured to:
  determine, based on road information or sensing information, whether a current driving condition is in a limit situation in which an autonomous driving control function is not able to operate,
  demand a transfer of a control authority of a vehicle to a user of the vehicle when determining that the current driving condition is in the limit situation in which the autonomous driving control function is not able to operate, during an autonomous driving control, and
  start a minimum risk maneuver when the control authority is not transferred to the user;
a storage configured to store a set of instructions to be executed by the processor, and data for determination and performance by the processor; and
an output device for outputting an autonomous driving control state, or a device related to the autonomous driving control in the vehicle, wherein the processor is further configured to:
- transmit an emergency light activation signal to automatically flash an emergency light when the minimum risk maneuver is started,
- release the autonomous driving control when the control authority is transferred to the user within a predetermined time after starting the minimum risk maneuver,
- determine whether the vehicle is stopped when the control authority is not transferred to the user within the predetermined time after starting the minimum risk maneuver,
- when a turn-off demand of the user is received by the processor while the vehicle is not stopped after the minimum risk maneuver is started, ignore the turn-off demand of the user and continually transmit the emergency light activation signal to maintain a turn-on state of the emergency light until the vehicle is stopped, and
- when the vehicle is stopped after the minimum risk maneuver is started, transmit an emergency light deactivation signal to turn off the emergency light in response to determining that the vehicle is stopped when a turn-off demand is received from the user.

5. The autonomous driving control apparatus of claim 4, wherein the processor is configured to: perform the reactivation command of the autonomous driving control when the vehicle is stopped after the minimum risk maneuver is started and the reactivation command of the autonomous driving control is inputted from the user after the vehicle is restarted.

* * * * *